United States Patent
Bradley et al.

(10) Patent No.: US 12,300,858 B2
(45) Date of Patent: May 13, 2025

(54) ASSEMBLY AND METHOD FOR BATTERY MAINTENANCE

(71) Applicant: Transportation IP Holdings, LLC, Norwalk, CT (US)

(72) Inventors: Neil Bradley, Erie, PA (US); Ajith Kuttannair Kumar, Erie, PA (US); Micah Plott, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 847 days.

(21) Appl. No.: 17/478,470

(22) Filed: Sep. 17, 2021

(65) Prior Publication Data

US 2023/0093574 A1    Mar. 23, 2023

(51) Int. Cl.
*H01M 50/574* (2021.01)
*H01G 11/78* (2013.01)
*H01M 50/271* (2021.01)

(52) U.S. Cl.
CPC ......... *H01M 50/574* (2021.01); *H01G 11/78* (2013.01); *H01M 50/271* (2021.01)

(58) Field of Classification Search
CPC ............. H01M 50/574; H01M 50/271; H01M 50/249; H01M 50/296; H01M 50/591; H01M 50/287; H01M 50/588; H01M 10/425; H01G 11/78; B60L 50/64; B60L 3/0046
USPC ......................................................... 429/97
See application file for complete search history.

(56) References Cited

U.S. PATENT DOCUMENTS

| | | | |
|---|---|---|---|
| 2016/0226108 A1* | 8/2016 | Kim | H01M 10/425 |
| 2019/0009665 A1* | 1/2019 | Maskew | B60L 3/0046 |
| 2021/0129651 A1 | 5/2021 | Klomberg et al. | |
| 2021/0367219 A1* | 11/2021 | Liu | A24F 40/95 |
| 2023/0010305 A1* | 1/2023 | Lee | H01M 50/213 |
| 2023/0084361 A1* | 3/2023 | Wang | H01M 50/284 |
| | | | 429/163 |
| 2024/0128577 A1* | 4/2024 | Buck | B62H 5/001 |

FOREIGN PATENT DOCUMENTS

| | | | | |
|---|---|---|---|---|
| CN | 210984802 U | * | 7/2020 | ............. Y02E 60/10 |
| CN | 211789350 A | * | 10/2020 | ............. B60L 50/64 |
| DE | 102018104260 A1 | * | 8/2019 | ............. A45B 19/00 |
| EP | 3273508 B1 | | 6/2021 | |

OTHER PUBLICATIONS

DE 102018104260 A1 machine translation (Year: 2018).*

(Continued)

*Primary Examiner* — Jonathan G Leong
*Assistant Examiner* — John S Medley
(74) *Attorney, Agent, or Firm* — K&L Gates LLP (57) ABSTRACT

An assembly is provided that may include a battery, and an end cap mechanically and electrically coupled to the battery. The end cap may contain an electrical connector with at least one electric cable configured to supply current to at least one operating system electrically coupled to the battery. The end cap may also contain at least one electronic board coupled to the battery, and may be configured to detach from the battery to provide access to the electrical connector and the electronic board.

19 Claims, 7 Drawing Sheets

(56) References Cited

OTHER PUBLICATIONS

Partial EP Search Report received for related EP App.: 22193811.1 dated Feb. 13, 2023 (14 pages).
Extended EP Search Report received for related EP App.: 22193811.1 dated May 15, 2023 (13 pages).
Ficosa: "EBOX—Electric Box—Ficosa", Feb. 19, 2019 (Feb. 19, 2019) XP093020725, Retrieved from the Internet: URL:https://www.ficosa.com/products/emobil ity/ebox/ [retrieved on Feb. 3, 2023].
Insideevs: "Details on Audi's Battery Technology", Dec. 12, 2015 (Dec. 12, 2015), XP093020761, Retrieved from the Internet: URL:https://insideevs.com/news/328601/deta ils-on-audis-battery-technology/ [retrieved on Feb. 3, 2023].
Examination Report No. 1 for corresponding AU Application No. 2022228144 dated Nov. 8, 2024 (5 pages).

* cited by examiner

ASSEMBLY AND METHOD FOR BATTERY MAINTENANCE

BACKGROUND

Technical Field

The subject matter described relates to assemblies and methods related to providing maintenance for a battery.

Discussion of Art

Vehicles are utilized for both transportation of passengers and/or transportation of cargo. The vehicles can be in single or multi-vehicle systems. Numerous power systems exist for powering the vehicles, including internal combustion engines, batteries, hybrid systems, hydraulic systems, etc.

When a vehicle system utilizes a high powered battery, significant care may be needed to prevent injuries to maintenance workers through electrocution, shock, or otherwise. Unlike an engine that can be turned off, a battery may have voltage present while the vehicle system is deactivated. As a result, maintenance personnel have to take extra precautions to protect themselves from voltage and arc hazards during installation, inspection, removal, replacement, etc., of the battery. Consequently, a large amount of personal protective equipment (PPE) may be required to service a high voltage battery. The PPE can include rubber gloves, an entire arc flash suit or clothing, along with typical safety glasses, safety wear, etc., that is bulky, difficult to store, and costly. In addition, changing into and out of the PPE to service the battery is time consuming and inefficient.

The additional safety clothing typically provides inconvenience at rail stations. In particular, storing equipment for every maintenance worker is not practical, and the amount of time required to take on and off such equipment results in significant inefficiencies and delays when passengers and/or cargo is on a schedule.

BRIEF DESCRIPTION

In one or more embodiments, an assembly is provided that may include a battery, and an end cap mechanically and electrically coupled to the battery. The end cap may contain an electrical connector with at least one electric cable configured to supply current to at least one operating system electrically coupled to the battery. The end cap may also contain at least one electronic board coupled to the battery, and may be configured to detach from the battery to provide access to the electrical connector and the electronic board.

In one or more embodiment, an assembly is provided that may include a battery, and an end cap mechanically and electrically coupled to the battery. The end cap may include a first section that contains an electrical connector with at least one electric cable configured to supply current to at least one operating system electrically coupled to the battery. The end cap may also include a second section that contains at least one electronic board coupled to the battery. The assembly may additionally include a service disconnect electrically coupled within a circuit including the battery and the electrical connector. The service disconnect can be configured to provide an electrical connection between the battery and the electrical connector in a connect position, and disconnect the battery and the electrical connector in a disconnect position. The assembly may also include a cover that may be coupled to the first section of the end cap to enclose the electrical connector within the first section. The cover may also include a tab portion positioned adjacent the service disconnect such that the service disconnect inhibits movement of the cover by engaging the tab portion when the service disconnect is in the connect position.

In one or more embodiments, an assembly is provided that may include a battery, and an end cap mechanically and electrically coupled to the battery. The end cap may include a first section that contains an electrical connector with at least one electric cable configured to supply current to at least one operating system electrically coupled to the battery. The end cap may also include a second section that contains at least one electronic board coupled to the battery. The assembly may also include a tag coupled within the first section of the end cap and configured to move from an unlocked position to a locked position. In the locked position the tag may cover an electrical port that receives the electrical connector.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to an energy storage assembly configured to facilitate maintenance of a battery of a vehicle system in the field, which can reduce the PPE required to provide the maintenance. In one embodiment, the battery that is maintained is a high powered or high voltage battery (e.g., with a storage capacity of at least two hundred volts). Alternatively, the battery that is maintained may be a battery with a storage capacity that is less than two hundred volts. The battery assembly utilizes a removable end cap that includes a cover that encases electric cables and is coupled to a disconnect switch. This switch can operate so that removal of the cover to access the electric cables disconnects current supplied to the electrical cables from the battery. In addition, spacing is provided for a clamp current meter to couple to the electrical cables, while a magnet is provided in the cover and/or endcap adjacent the electric cables for a Gaussmeter. In this manner, a live dead live test may be easily conducted prior to contacting the electric cables. The battery assembly can also include a compartment that can include a removable panel that may be configured to permit access to an electronic board such a computer processing unit (CPU) card, wireless card, etc. without removal of the endcap. In this manner, the electrical components that often malfunction can be accessed without exposing a maintenance worker to the electric cables that may contain high powered voltage. In addition, a lock out tag out (LOTO) feature is also provided to allow a maintenance worker to leave during maintenance without fear another will attempt plug back in electric cables before maintenance can be completed.

Figure 1:
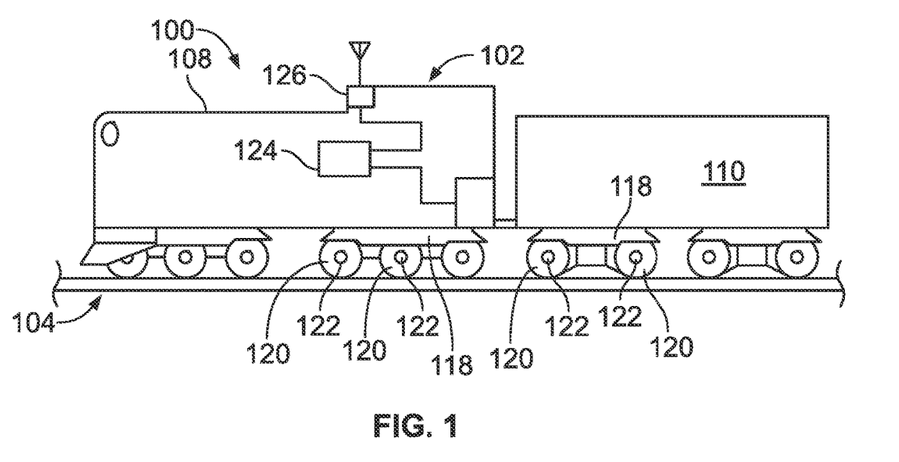
FIG. 1 illustrates a block schematic diagram of a vehicle system.
Figure 2:
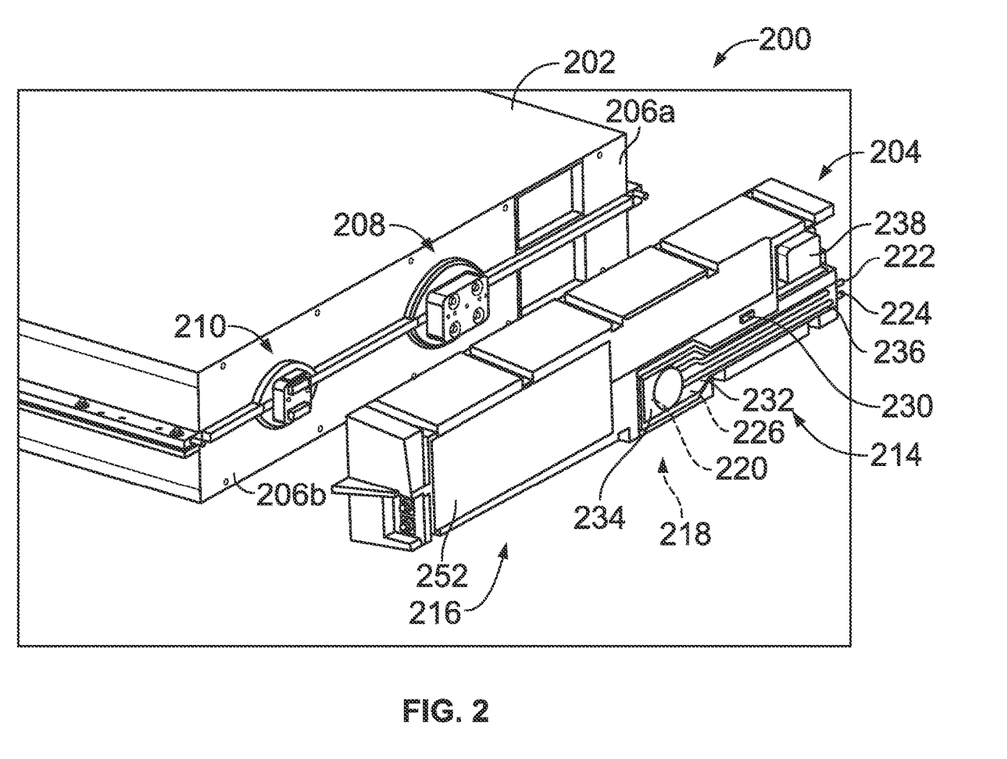
FIG. 2 illustrates an exploded front perspective view of an energy storage assembly.

FIG. 1 illustrates a schematic diagram of one example of a vehicle system 100 that includes an assembly 102. The vehicle system may be configured to travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. Alternatively, the vehicle system may be formed of only a single propulsion-generating vehicle.

The propulsion-generating vehicle may generate tractive efforts to propel (for example, pull or push) the vehicle system along routes. The propulsion-generating vehicle includes a propulsion subsystem, such as an engine, one or more traction motors, and/or the like, that operate to generate tractive effort to propel the vehicle system. The propulsion-generating vehicle also includes a braking system that generates braking effort to slow or stop movement of the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles in the vehicle system are logically or virtually coupled together, but not mechanically coupled together. The vehicle system may be a rail vehicle, aquatic vehicle or fleet of aquatic vehicles, an airplane or fleet of air planes, an off road vehicle, tractor trailers, construction vehicles, mining vehicles, automobiles, trucks, combines, tractors, or the like.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc.

The assembly may further include an energy storage device 124 utilized for powering operating systems of the vehicle system. The energy storage device can include one or more batteries or battery cells. In one example, the energy storage device may be a high voltage battery, including operating or having a storage capacity between 200 Volts and 400 Volts, inclusive. Alternatively, the energy storage device may store more than 400 volts or less than 200 volts. The energy storage device may be a main power source for propelling the vehicle system, part of a hybrid power source for propelling the vehicle system, an auxiliary power source for powering operating systems other than for propelling the vehicle system, or the like. The operating system may include the propulsion system, braking system, lighting systems, communication systems, fluid level systems, traction control systems, etc.

FIGS. 2-9 provide various views of an energy storage assembly 200. In one example, the energy storage assembly is a high voltage battery for powering a vehicle system, including the vehicle system of FIG. 1. As used herein, a high voltage battery includes a battery that produces at least 200 Volts, and can include batteries that produce 200 to 400 Volts, 600 to 3000 Volts, including DC battery assemblies. Still, in other examples, the energy storage assembly may include one or more fuel cells, supercapacitors, flywheels, or the like.

The energy storage assembly 200 includes one or more batteries 202 and an end cap 204. The battery may be comprised of numerous individual batteries or battery cells 206a, 206b coupled to one another. The coupled batteries may be coupled in series, in parallel, a combination of series and parallel, etc. In another example, the battery only has a single battery cell. The battery also includes an electrical connector port 208 for receiving an electrical connector. The electrical connector port includes individual ports that can include live ports, ground ports, etc. for providing an electric coupling.

The battery may also include a communication port 210 for electronically and/or electrically coupling with at least one processor on a circuit board of the end cap. The communication port be a hard wire port, USB port, ethernet port, or the like. The communication port provides a communication pathway to receive data and information related to the battery.

The end cap is mechanically and electrically coupled to the battery and includes a housing 212 with a first compartment 214 and a second compartment 216 next to or near the first compartment. In one example, the housing is of one-piece construction such that the entire end cap can be removed. Alternatively, the first compartment and second compartment can be detachably coupled to one another such that the first and second compartments can be detached and removed simultaneously from the battery, or optionally, detached and removed from the battery separately for one another. In this manner, electrical components contained in each compartment can be individual maintained without requiring removal of the other compartment.

In one example embodiment, the first compartment of the end cap contains an electrical connector 218 that electrically couple to the electrical connector port of the battery. The electrical connector may include a head 220, first electric cable 222 and a second electric cable 224. At least one of the first electric cable or second electric cable is configured to supply current to at least one operating system electrically coupled to the battery. In one example, one of the first electric cable or second electric cable may be a ground.

The first compartment may include a cavity 226 that receives the head of the electrical connector, a first channel 228 for receiving the first electric cable, and a second channel 230 for receiving the second electric cable. In one example, each of the first channel and second channel are arcuate channels shaped to matingly receive the first electric cable and second electric cable respectfully. By providing the cavity, first channel, and second channel facilitates preventing mis-wiring by aligning the electrical connector within the first compartment. The first electric cable and second electric cable may extend within the cavity before engaging the first and second channels respectfully. In this manner, the cavity is of size and shape, and configured to allow a clamp of a clamp current meter to be placed around each cable without the user being required to physically contact either electric cable. Consequently, a live dead live test may be performed on the electrical connector without the need to physically contact the electrical connector. A live dead live test is a test where a testing device such as a clamp current meter, gaussmeter, voltmeter, etc. is first tested on a live outlet, or electric source to show the testing device is operating appropriately, then placed to determine if current is still conducted through a cable, outlet, etc. that is supposed to be disconnected. If the cable, outlet, etc. is disconnected, no reading is provided, whereas, if not properly disconnected or operating, a read representative of a current being present is detected.

Optionally, to assist in a live dead live test a magnet 230 can be provide associated with the first compartment. In the example embodiment illustrated in FIGS. 2-5 the magnet may be placed in the end cap above the first cable and second cable. In this manner, a gaussmeter can utilize the magnet to present to a maintenance worker that the gaussmeter may be working before determining with the gaussmeter whether current may be conducted through either of the first electric cable or second electric cable. Alternatively, the magnet may be in the second compartment, in a cover of the first compartment, etc. In yet another example, a switched current source may be utilized in association with the magnet.

The first compartment may also include a cover 232 (FIG. 3, removed in FIG. 4) that may be matingly received within the cavity to encase, or enclose the electrical connector within the first compartment of the end cap. In one example, the cover may be made of a transparent material. In another example, the cover may be made of material that does not affect a magnetic field generated as a result of current in either the first electric cable or second electric cable. In this manner, a gaussmeter may detect current in either of the first electric cable or second electric cable without a need to physically contact the electric cables. In another embodiment, the cover may include openings 233 to allow a clamp of a clamp current meter to be placed around one of electric cables. In each instance, the cover provides structure to allow a live dead live test without a maintenance person performing the test from having to physically contact the electrical connector.

Figure 3:
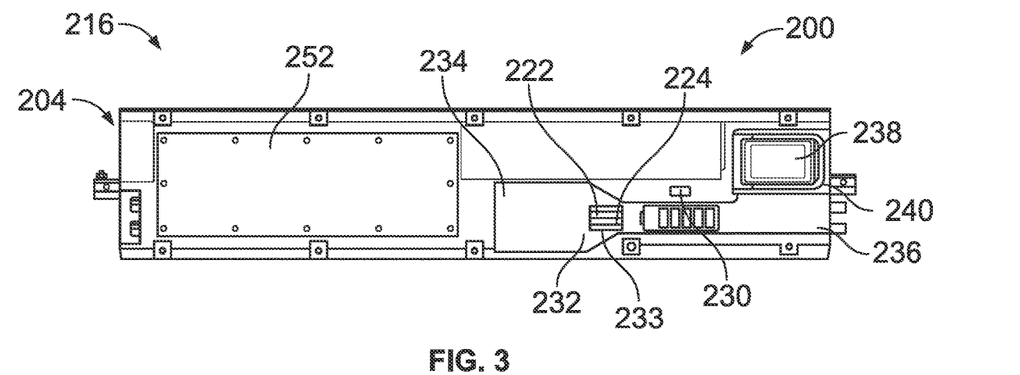
FIG. 3 illustrates a front plan view of an energy storage assembly.
Figure 4:
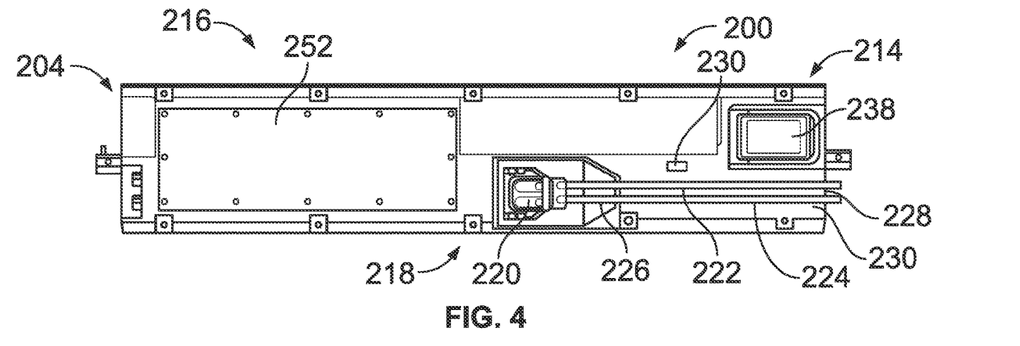
FIG. 4 illustrates a front plan view of an energy storage assembly.
Figure 5:
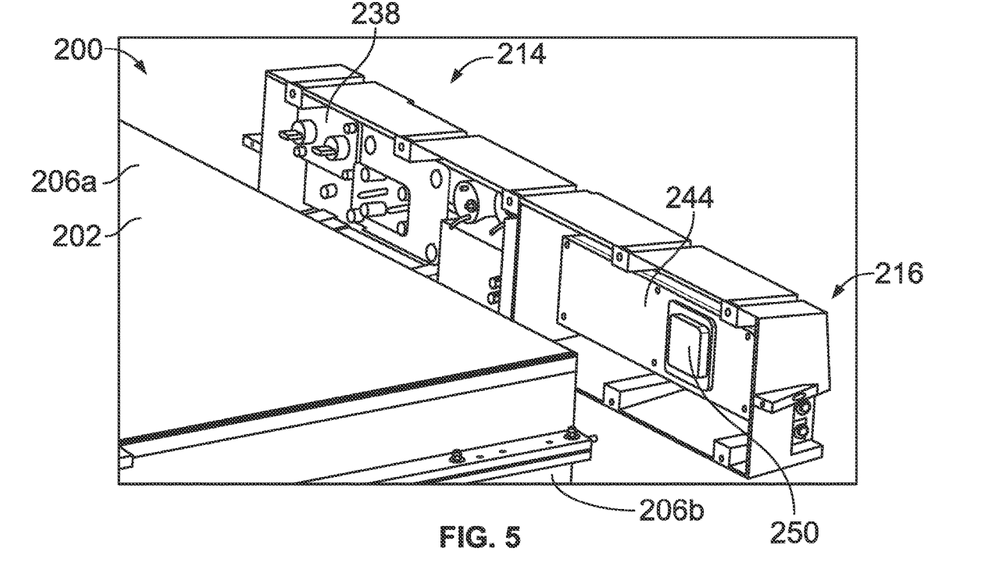
FIG. 5 illustrates an exploded back perspective view of an energy storage assembly.
Figure 6:
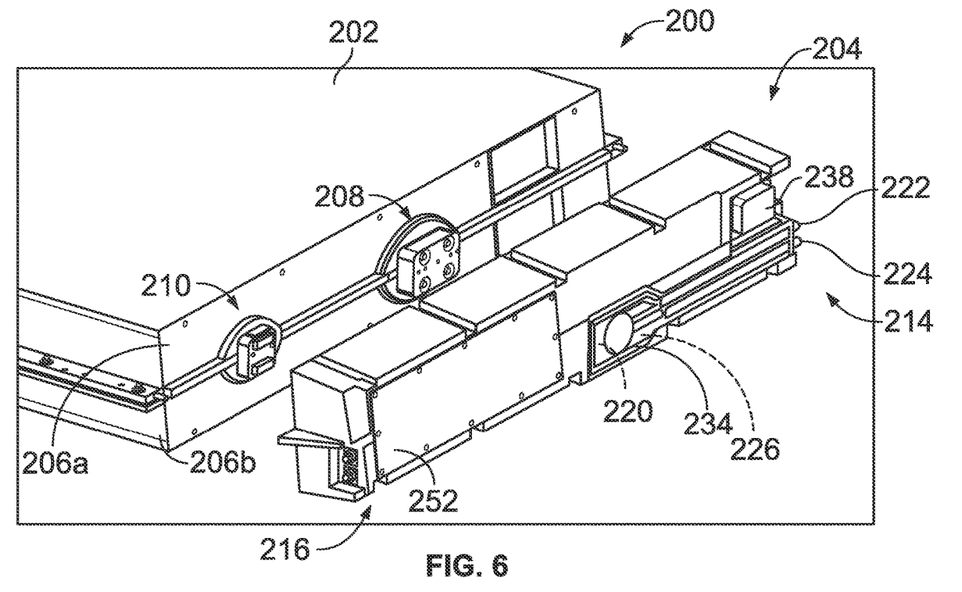
FIG. 6 illustrates an exploded front perspective view of an energy storage assembly.
Figure 7:
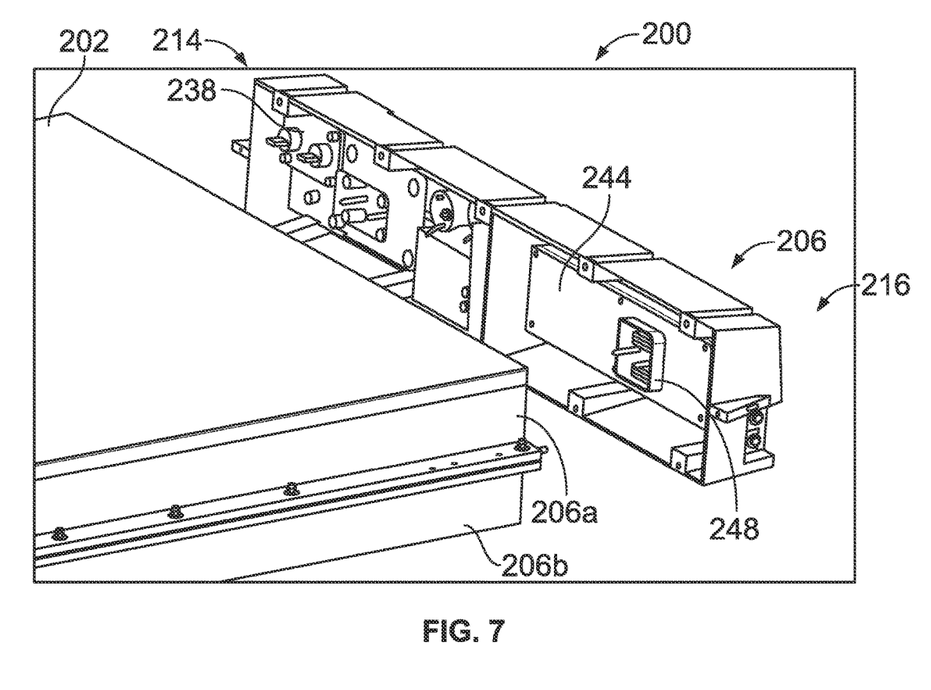
FIG. 7 illustrates an exploded back perspective view of an energy storage assembly.
Figure 8:
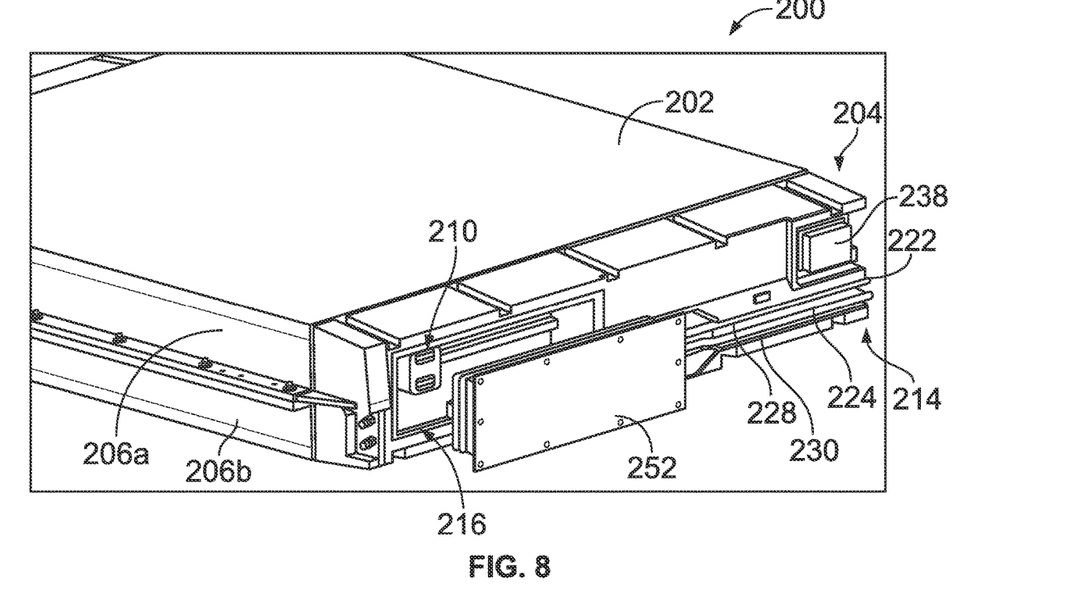
FIG. 8 illustrates an exploded front perspective view of an energy storage assembly.
Figure 9:
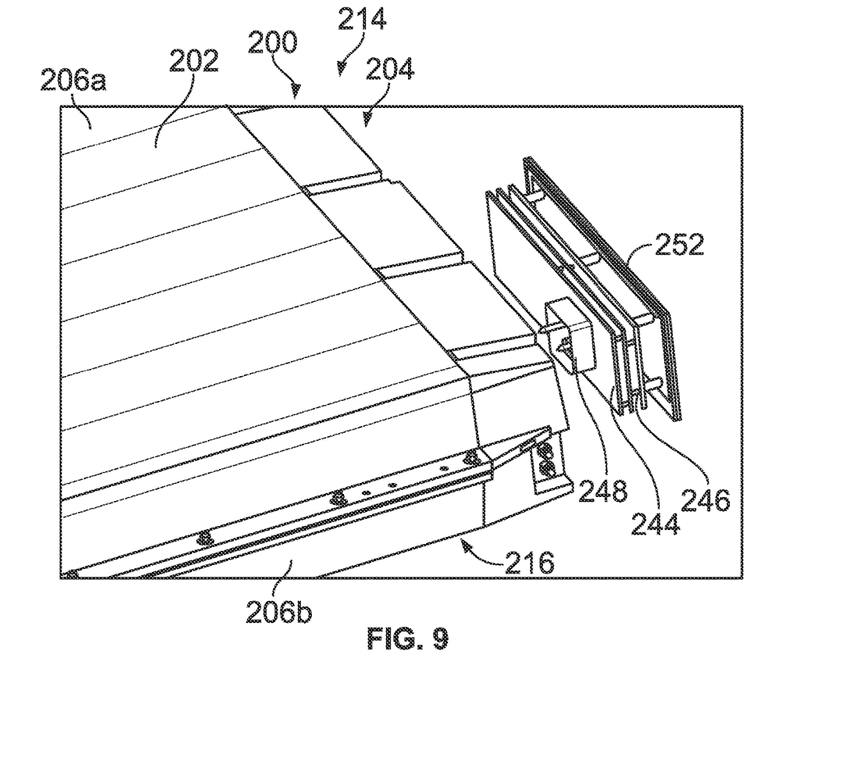
FIG. 9 illustrates an exploded back perspective view of an energy storage assembly.
Figure 10:
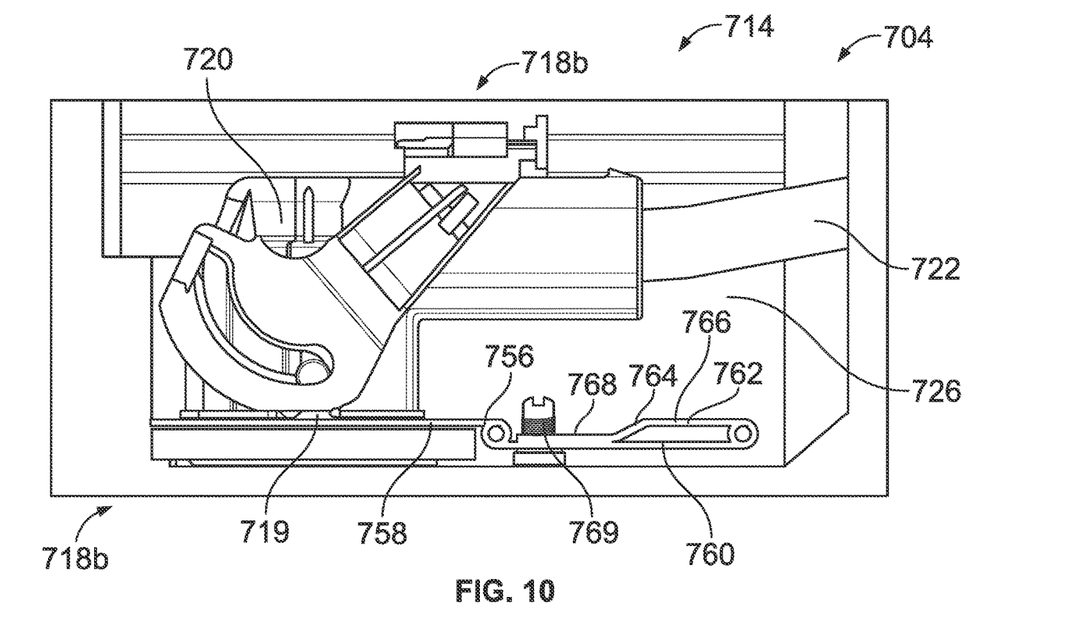
FIG. 10 illustrates a front plan view of a portion of an energy storage assembly.
Figure 11:
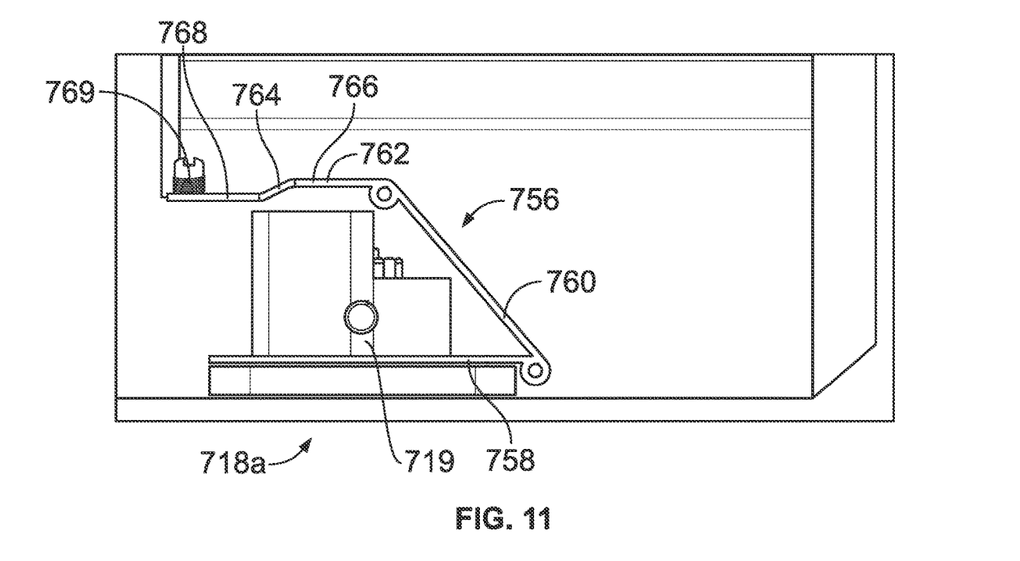
FIG. 11 illustrates a front plan view of a portion of an energy storage assembly.

In one example the cover extends from a first end 234 adjacent the head of the electrical connector to a second end 236 at an edge of the end cap. At the second end, the cover may extend into the first compartment behind a service disconnect 238, and then extend upwardly into a tab section 240 that may be behind the service disconnect. In this manner, the cover cannot be removed unless the service disconnect is removed. In particular, a service disconnect includes an electrical connection in a circuit between the battery and the electrical connector. As a result, removal of the service disconnect causes the circuit to be disconnected such that current is no longer conducted to or through the first or second electric cable. This again ensures that an individual providing maintenance on the electrical connector does not physically engage the electrical connector unless power to the electric cables has been disconnected and a test can be provided to verify the disconnection has occurred. In this manner, the only protective clothing required for servicing the electrical connector are safety glasses and work gloves that are typically found at a maintenance facility and easily stored.

The second compartment meanwhile, receives a first board 244, and a second board 246. Optionally, the second compartment receives only one board, whereas in other example embodiments, the second compartment receives more than two boards. In one example each board may be a circuit board that include electronic components for monitoring and managing the battery and communicating data and information related to the battery. In one example, one of first board and/or second board may be a computer processing unit (CPU) card. Optionally, the first board and second board may be electrically coupled to one another. In one example, the first board and/or second board may include a wired communication connection 248 whereas in an alternative example, the first board and/or second board may include a wireless communication connection 250.

FIGS. 6-9 illustrate that the first board and second board may be secured to a panel 252 that may be coupled within the second compartment. The panel may be bolted, screwed, provided with removeable adhesive, friction fit, etc. to be removably secured within the second compartment. In addition, the panel may include slotted section allowing the first board, and/or second board to slide into the slotted section to removably secure the first board and/or second board to the panel. In other example embodiments, the first board, and/or second board may be coupled and secured to the panel via fasteners, connectors, removable adhesive, Velcro, friction fit, or the like. By securing the first board and second board to the panel that may be removable from the second compartment, in order to provide maintenance on the first board and second board, the panel need only be removed without having to be exposed to the battery or electrical connector in the first connector. In particular, the electronics of a CPU card are often the reason for the need for a repair. By separating the CPU card from electrical components such as the electrical connector that can have the dangerous voltage requiring enhanced protective clothing, a maintenance person can check the CPU without needing to wear the enhanced protective clothing as they are never exposed to the electrical connector.

FIGS. 10-13 illustrate an additional safety feature for an example energy storage assembly. In example embodiments, the energy storage assembly may include one or more high powered batteries, fuel cells, supercapacitors, flywheels, or the like. In this example embodiment, the energy storage assembly utilizes a battery that is not illustrated and instead only the end cap 704, and more specifically, only the first compartment 714 of the endcap is illustrated. Consequently, as illustrated in more detail than FIGS. 2-9 the first compartment of the end cap contains a socket 718a for an electrical connector 718b that electrically couples to the electrical connector port of the battery. The socket may be provided to align the electrical connector for receipt by the battery. In particular, the socket may include a coupling section 719a configured to receive the head 720 of the electrical, and a flange 719b extending away from the coupling section and engaging the end wall of the first compartment. The electrical connector may include a head, first electric cable 722 and a second electric cable (not shown). In this embodiment, similar to the embodiment of FIGS. 2-9, the first compartment may include a cavity 726 that receives the head of the electrical connector, a first channel 728 for receiving the first electric cable, and a second channel 730 for receiving the second electric cable. In the example embodiment illustrated in FIGS. 10-13, a cover and service disconnect are not shown, but only for illustrative purposes.

FIGS. 10-13 also illustrate a lock out tag out (LOTO) assembly 754. The LOTO assembly in this embodiment includes a cover 756 that has a first section 758 pivotably coupled to a second section 760, that may be pivotably coupled to a third section 762. In one example, the first section, second section, and third section may be hingedly coupled to one another.

The first section may be configured to couple to the socket. In one example, the first section may be straight and have an opening such that the first section surrounds and engages and may be secured to the flange of the socket. In this manner, the first section of the cover provides a base for the second and third sections of the cover.

In a first position (FIG. 10), the second section and third section are within the cavity in a stored position. In particular, the second section extends away from the first section, and in one example may be parallel to the first section. The third section may include a bend 764 to provide a first portion 766 that extends from the second section, and a second portion 768 that extends from the bend. The second portion as a result engages and runs along the second section when the second section and third section are in the stored position. In one example, a captive fastener 769 such as a bolt, screw, rivet, or the like may be provided to extend through the second section and third section and into the first compartment to hold the second section and third section in place in the stored position.

In a second position (FIG. 11), the electrical connector may be removed leaving only the socket in the cavity. In the second position, or locked position, the second section and third section extend over the opening provided by the socket. In the locked position, the captive fastener can secure the third section to the cavity of the first compartment. In this manner the cover may be secured in the locked position, where in the locked position, the electrical connector cannot be inserted into the socket because the cover blocks or prevents the insertion.

Figure 12:
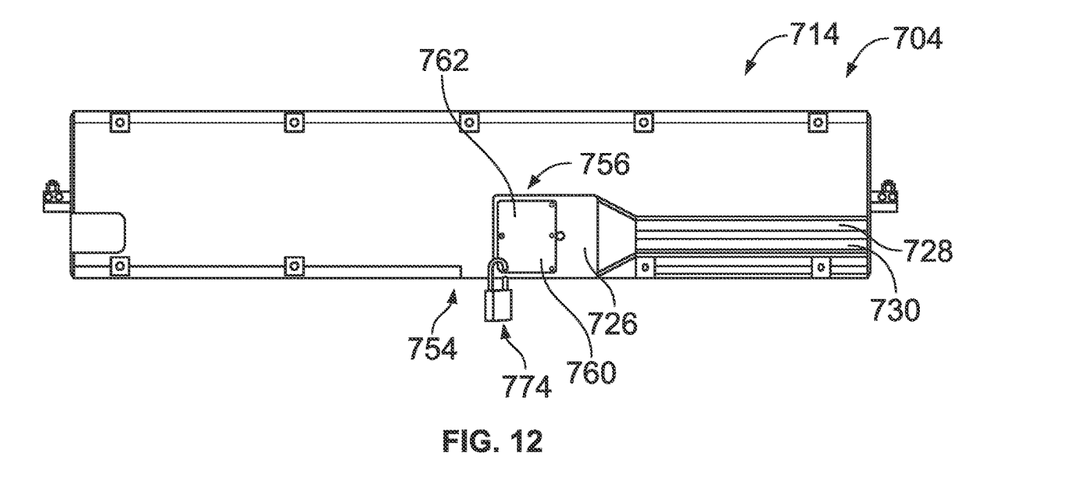
FIG. 12 illustrates a front perspective view of an energy storage assembly.
Figure 13:
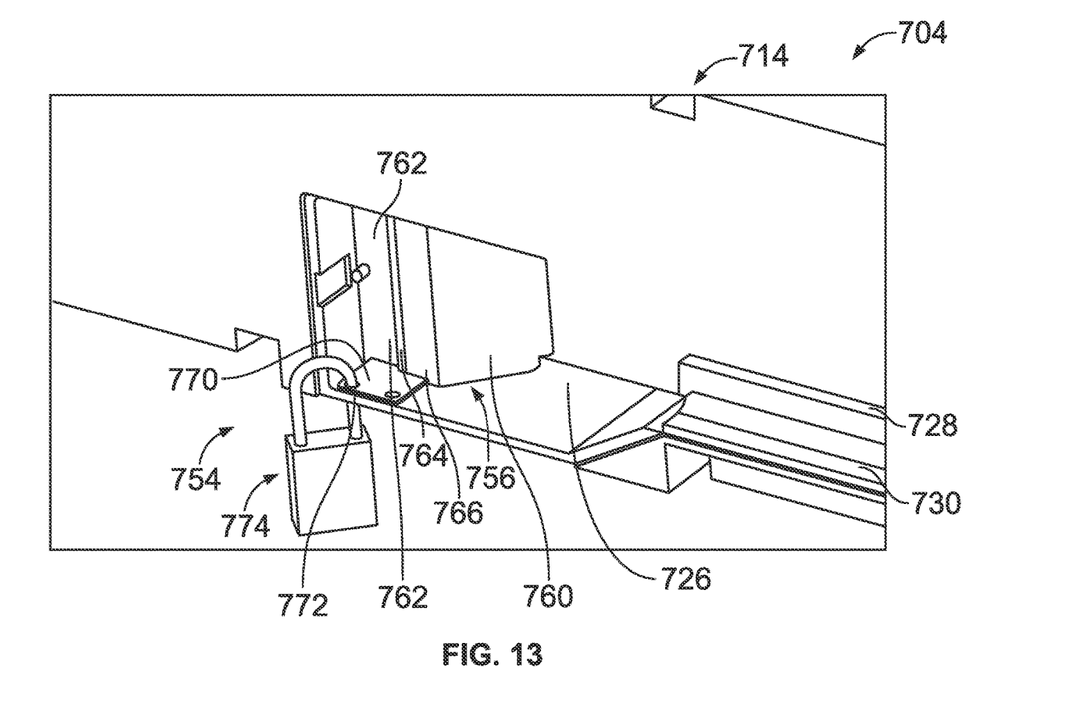
FIG. 13 illustrates a front perspective view of an energy storage assembly.

As illustrated in FIGS. 12 and 13, the cover may also include a flange 770 that extends from socket and includes an opening 772 that aligns with one or more openings in the first compartment. In this manner, when a person that is performing maintenance on the electrical connector has to leave the work area before inserting the electrical connector back into the socket, the person can secure a lock 774 through the aligned openings. This prevents any person not trained in providing maintenance for a high voltage battery from attempting to connect the electrical connector and ensures that only the maintenance worker who has access to the key for the lock can reinsert the electrical connector into the socket.

Figure 14:
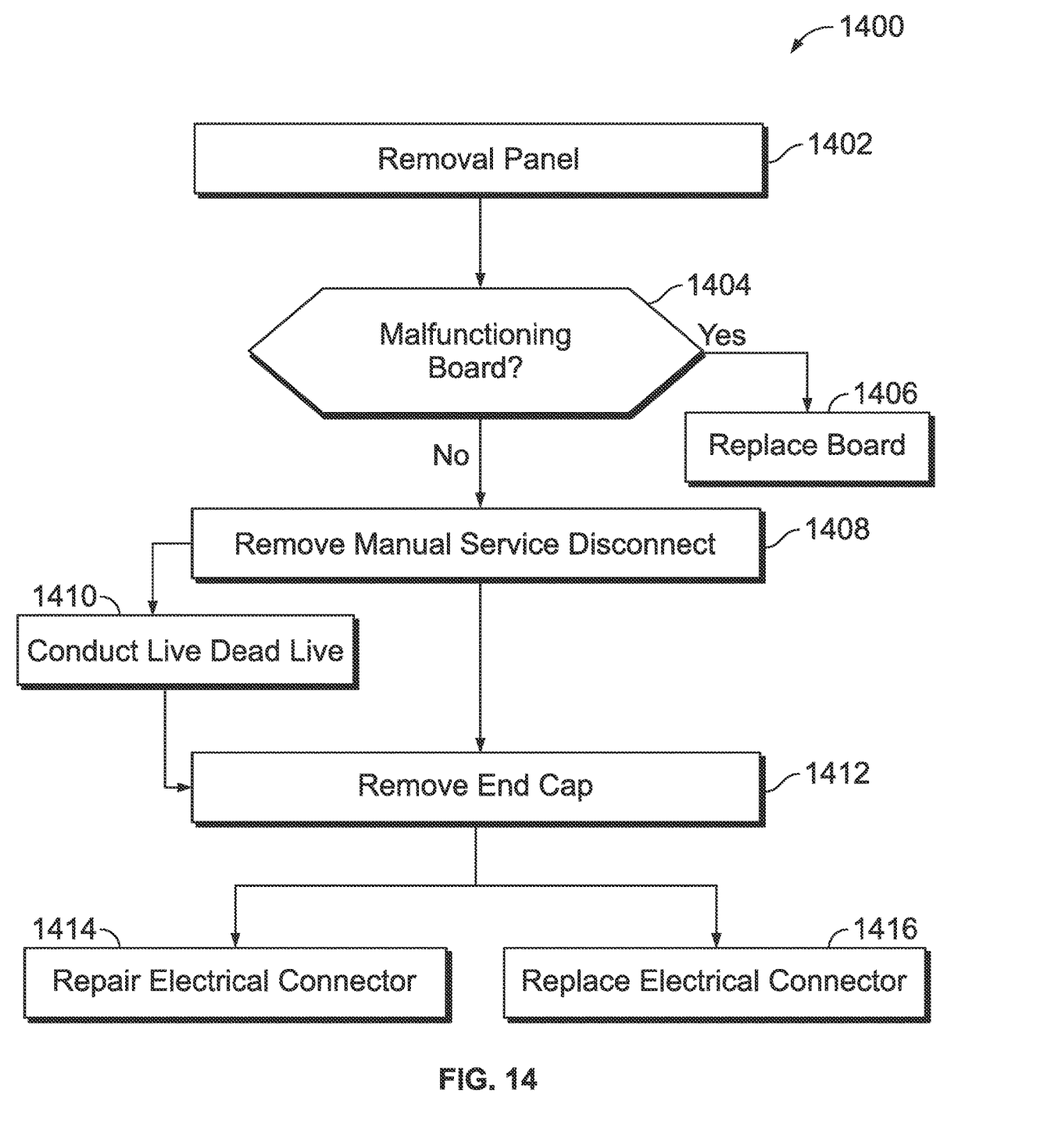
FIG. 14 illustrates a flow block diagram of a method to maintain an energy storage assembly.

FIG. 14 illustrates a method 1400 for providing maintenance for a high voltage battery. In one example, the energy storage assembly of FIGS. 2-9 is provided for performing maintenance, while in another example, the energy storage assembly of FIGS. 10-13 may be provided. During maintenance, when the method is followed, the maintenance personnel need only wear safety glasses and gloves that are common in maintenance areas.

At 1402, a panel having at least one board may be removed from an endcap of a battery. In one example the panel may be bolted into a second compartment of the end cap that also includes a first compartment that encloses an electrical connector. In the example, once the bolts are removed, the at least one board may be secured to the panel so that the at least one board may be removed from the panel. In one example, the at least one board slides out of the panel for inspection. In one embodiment, the at least one board may be a CPU card. By providing two separate compartments, including the first compartment that has the electrical connector that may be completely enclosed, there may be no need to wear additional PPE.

At 1404, a determination may be made if the at least one board may be malfunctioning. The maintenance person can check that at least one board has a malfunctioning component, including rectifiers, resistors, capacitors, transformers, transistors, or the like. If at 1404 the at least one board is malfunctioning, at 1406, the at least one board may be repaired or replaced. In one example, a new CPU card may be secured to the panel, and the panel may be simply reinserted into the second compartment and secured with bolts. In another example, just the malfunctioning component may be replaced before securing the at least one board to the panel. In another example, a component may be traded out, such as replacing a wired communication connection with a wireless coupling. In each instance, the at least one board may be repaired or replaced without having to utilize specialized PPE.

If at 1404 the at least one board is not malfunctioning, then at 1408, the service disconnect may be removed from the first compartment. After a determination is made that the at least one board is not malfunctioning, and the panel may be inserted and secured back in the end cap, the electrical connector may be examined for malfunctioning. The first step may be to remove the service disconnect to break the circuit between the battery and the electrical connector. In this manner, the electrical connector stays encased in the endcap until current is no longer conducted to the electrical connector. Thus, the maintenance worker does not have to handle the electrical connector until the electrical connector is no longer powered.

At 1410, optionally, a live dead live test may be conducted by the maintenance worker to determine whether the electrical connector, including the cables still have current conducted through the cables. In one example, the worker has a gaussmeter and moves the probe across the magnet within either the housing, or cover of the first compartment. In this manner, the worker verifies that the gaussmeter is operational and working. The gaussmeter may then be run across each electric cable while the cover remains in place. In one example, the cover may be made of a material that may be transmissive to magnetic fields. In another example, the cover includes an opening providing access to each electric cable such that the gaussmeter can be run over the cables. In yet another example, a worker utilizes a clamp current detector, and either inserts the clamp through an opening in the cover and around a cable, or removes the cover and inserts the clamp around each cable as a result of size and shape of the cavity.

If at 1410, a determination is made that current is still running through at least one of the cables, then at 1412, the end cap may be removed from the battery. If current is still running through a cable, the entire end cap may be removed from the battery to physically disconnect the electrical connector from the battery. As a result, back up disconnect is provided if the service disconnect does not result in stopping conduction of current to the electrical connector. In this manner, the worker can both disconnect the power to the electrical connector using the service disconnect, and verify no power is provided utilizing a live dead live test before the worker has to physically contact the electrical connector. In most instances, the cover does not have to even be removed to do so, preventing access to the electrical connector until after verification that no power is provided to the electrical connector. As a result the worker only needs safety glasses for providing maintenance on the electrical connector.

If at 1410, no current is detected, then at 1414 maintenance can be provided on the electrical connector. The electrical connector may be replaced, a cable may be replaced, or the like. If the electrical connector needs to be replaced, then at 1416 after removal of the electrical connector, if the worker needs to leave the battery, the worker can cover the socket of the electrical connector with a LOTO assembly and lock the cover of the LOTO assembly. In this manner, another individual that is not supposed to have access to the electrical connector or socket cannot make a mistake and attempt to connect the electrical connector to the socket.

In all, because of the extra safety features provided herein, a maintenance worker may provide maintenance on a battery with limited PPE. By providing access, opportunities for live dead live tests, the service disconnect, etc. a minimum amount of PPE may be required, saving time and space.

In one or more embodiments, an assembly is provided that may include a battery, and an end cap mechanically and electrically coupled to the battery. The end cap may contain an electrical connector with at least one electric cable configured to supply current to at least one operating system electrically coupled to the battery. The end cap may also contain at least one electronic board coupled to the battery, and may be configured to detach from the battery to provide access to the electrical connector and the electronic board.

Optionally, a service disconnect may be electrically coupled within a circuit including the battery and the electrical connector. The service disconnect may be configured to provide an electrical connection between the battery and the electrical connector in a connect position, and disconnect the battery and the electrical connector in a disconnect position. In one aspect, the service disconnect may be configured to be secured within the end cap in the connect position, and the service disconnect may be configured to be removed from the end cap in the disconnect position. In another aspect, the energy storage assembly may also include a cover coupled to the end cap and configured to encase the electrical connector within the end cap. In one example, the cover may be coupled to the service disconnect to inhibit removal of the cover when the service disconnect is in the connect position. In another example, the cover may include an opening adjacent the at least one electric cable to permit access to the at least one electric cable. Alternatively, the cover may include a magnet disposed therein. In another example, the end cap may include a magnet disposed therein.

Optionally, the end cap may include a cavity configured to receive the electrical connector. The cavity may also be configured to accommodate a clamp of a clamp sensor around the at least one electric cable. In one aspect, the cavity may include at least one channel configured to receive the at least one electric cable. In another aspect, the at least one electronic board may include at least one of one or more processors, or a transponder. In one example, the at least one electronic board may include a first electronic board including one or more processors, and a second electronic board including a transponder and electrically coupled to the first electronic board. In another example, the at least one electronic board may be a wireless transmission card. The wireless transmission card in one example may be a circuit board that includes circuitry to couple to a WiFi or other wireless network. In one example, the wireless transmission card may be referred to as a wireless Internet card. Alternatively, the at least one electronic board may be a computer processing unit card.

Optionally, the at least one electronic board may be electrically coupled to the battery. In one aspect, the at least one electronic board may be wirelessly coupled to the battery. In one example, the end cap may include a first section that contains the electrical connector, and a second section that contains the at least one electronic board. The second section may be configured to provide access to the at least one electronic board without removing the end cap from the battery. In another example, the end cap may include a removable panel coupled to the at least one electronic board and configured to secure the at least one electronic board when within the end cap, The removable panel may also be configured to detach from the end cap when not within the end cap.

Optionally, the energy storage assembly may also include a tag that may be coupled within the end cap and may be configured to move from an unlocked position to a locked position. In the locked position the tag may cover an electrical port that receives the electrical connector. In one aspect, the tag may include a base secured to the electrical port, a first hinge section coupled to the base, a second hinge section coupled to the first hinge section, and a fastener configured to secure the tag in the locked position and the unlocked position. In another aspect, the base may include an opening configured to receive a lock in the locked position to secure the tag in the locked position. In one example, the battery operates in a range between 200-400 volts.

In one or more embodiment, an assembly is provided that may include a battery, and an end cap mechanically and electrically coupled to the battery. The end cap may include a first section that contains an electrical connector with at least one electric cable configured to supply current to at least one operating system electrically coupled to the battery. The end cap may also include a second section that contains at least one electronic board coupled to the battery. The assembly may additionally include a service disconnect electrically coupled within a circuit including the battery and the electrical connector. The service disconnect can be configured to provide an electrical connection between the battery and the electrical connector in a connect position, and disconnect the battery and the electrical connector in a disconnect position. The assembly may also include a cover that may be coupled to the first section of the end cap to enclose the electrical connector within the first section. The cover may also include a tab portion positioned adjacent the service disconnect such that the service disconnect inhibits movement of the cover by engaging the tab portion when the service disconnect is in the connect position.

Optionally, the cover can include an opening adjacent the at least one electric cable to permit access to the at least one electric cable. In one aspect, the end cap may include a magnet disposed therein. In another aspect, the first section can include a cavity configured to matingly receive the electrical connector. The cavity can also be configured to accommodate a clamp of a clamp sensor around the at least one electric cable. In one example, the cavity can include at least one channel configured to receive the at least one electric cable. In another example, the second section may include a removable panel coupled to the electronic board and configured to provide access to the at least one electronic board without removing the end cap from the battery.

Optionally, the assembly also includes a tag coupled within the first section of the end cap, and may also be configured to move from an unlocked position to a locked position. In the locked position the tag can cover an electrical port that receives the electrical connector. In one aspect, the tag can include a base secured to the electrical port, a first hinge section coupled to the base, a second hinge section coupled to the first hinge section, and a fastener configured to secure the tag in the locked position and the unlocked position. In one example, the base can include an opening configured to receive a lock in the locked position to secure the tag in the locked position.

In one or more embodiments, an assembly is provided that may include a battery, and an end cap mechanically and electrically coupled to the battery. The end cap may include a first section that contains an electrical connector with at least one electric cable configured to supply current to at least one operating system electrically coupled to the battery. The end cap may also include a second section that contains at least one electronic board coupled to the battery. The assembly may also include a tag coupled within the first section of the end cap and configured to move from an unlocked position to a locked position. In the locked position the tag may cover an electrical port that receives the electrical connector.

Optionally, the tag can include a base secured to the electrical port, a first hinge section coupled to the base, a second hinge section coupled to the first hinge section, and a fastener configured to secure the tag in the locked position and the unlocked position. In one aspect, the base includes an opening configured to receive a lock in the locked position to secure the tag in the locked position.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An assembly comprising:
   an energy storage device;
   an end cap configured to be mechanically and electrically coupled to the energy storage device, wherein the end cap comprises:
      an electrical connector with at least one electric cable configured to supply current to at least one vehicle operating system electrically coupled to the energy storage device;
      at least one electronic board configured to be coupled to the energy storage device; and
   the end cap configured to detach from the energy storage device to provide access to the electrical connector and the at least one electronic board, wherein the end cap includes a removable panel coupled to the at least one electronic board, and the removable panel is detachable from the end cap by transitioning between an attached position, where the at least one electronic board is within the end cap, and a detached position, where the at least one electronic board is not within the end cap.

2. The assembly of claim 1, further comprising:
   a service disconnect configured to be electrically coupled with a circuit that includes or is connected with the energy storage device and the electrical connector, the service disconnect configured to provide an electrical connection between the energy storage device and the electrical connector in a connect position, and disconnect the energy storage device and the electrical connector in a disconnect position.

3. The assembly of claim 2, wherein the service disconnect is configured to be secured within the end cap in the connect position, and the service disconnect is configured to be removed from the end cap in the disconnect position.

4. The assembly of claim 2, further comprising a cover coupled to the end cap and configured to encase the electrical connector within the end cap.

5. The assembly of claim 4, wherein the cover is coupled to the service disconnect to inhibit removal of the cover when the service disconnect is in the connect position.

6. The assembly of claim 4, wherein one or more of the cover or the end cap includes a magnet configured to provide a magnetic field detectable by a guassmeter.

7. The assembly of claim 1, wherein the end cap includes a cavity configured to receive the electrical connector, the cavity configured to accommodate a clamp of a clamp sensor around the at least one electric cable.

8. The assembly of claim 1, wherein the at least one electronic board is at least one of a wireless transmission card or a computer processing unit card.

9. The assembly of claim 1, wherein the end cap includes a first section that contains the electrical connector, and a second section that contains the at least one electronic board, and the second section is configured to provide access to the at least one electronic board without removing the end cap from the energy storage device.

10. The assembly of claim 1, further comprising, a tag coupled within the end cap and configured to move from an unlocked position to a locked position, wherein the tag covers an electrical port that receives the electrical connector in the locked position.

11. The assembly of claim 10, wherein the tag includes a base secured to the electrical port, a first hinge section coupled to the base, a second hinge section coupled to the first hinge section, and a fastener configured to secure the tag in the locked position and the unlocked position.

12. An assembly comprising:
a battery;
an end cap mechanically and electrically coupled to the battery;
the end cap comprising:
a first section that contains an electrical connector with at least one electric cable configured to supply current to at least one operating system electrically coupled to the battery;
a second section that contains at least one electronic board coupled to the battery;
a service disconnect electrically coupled within a circuit comprising the battery and the electrical connector, the service disconnect configured to provide an electrical connection between the battery and the electrical connector in a connect position, and disconnect the battery and the electrical connector in a disconnect position; and
a cover coupled to the first section of the end cap to enclose the electrical connector within the first section, and wherein the cover comprises a tab portion positioned behind the service disconnect, wherein the tab portion prevents the cover from being removed when the service disconnect is in the connect position such that the service disconnect inhibits movement of the cover by engaging the tab portion when the service disconnect is in the connect position.

13. The assembly of claim 12, wherein the cover includes an opening adjacent the at least one electric cable to permit access to the at least one electric cable.

14. The assembly of claim 12, wherein the first section includes a cavity configured to matingly receive the electrical connector, the cavity also configured to accommodate a clamp of a clamp sensor around the at least one electric cable.

15. The assembly of claim 12, wherein the second section includes a removable panel coupled to the at least one electronic board and configured to provide access to the at least one electronic board without removing the end cap from the battery.

16. The assembly of claim 12, further comprising, a tag coupled within the first section of the end cap and configured to move from an unlocked position to a locked position, wherein in the locked position the tag covers an electrical port that receives the electrical connector.

17. An assembly comprising:
a battery;
an end cap mechanically and electrically coupled to the battery;
the end cap comprising:
a first section comprising an electrical connector with at least one electric cable configured to supply current to at least one operating system electrically coupled to the battery;
a second section comprising at least one electronic board coupled to the battery; and
a tag coupled within the first section of the end cap and configured to move from an unlocked position to a locked position, wherein in the locked position the tag covers an electrical port that receives the electrical connector.

18. The assembly of claim 17, wherein the tag includes a base secured to the electrical port, a first hinge section coupled to the base, a second hinge section coupled to the first hinge section, and a fastener configured to secure the tag in the locked position and the unlocked position.

19. The assembly of claim 18, wherein the base includes an opening configured to receive a lock in the locked position to secure the tag in the locked position.

* * * * *